May 16, 1944.  S. A. SCHERBATSKOY ET AL  2,349,225
WELL LOGGING INSTRUMENT
Filed Sept. 15, 1941   9 Sheets-Sheet 1
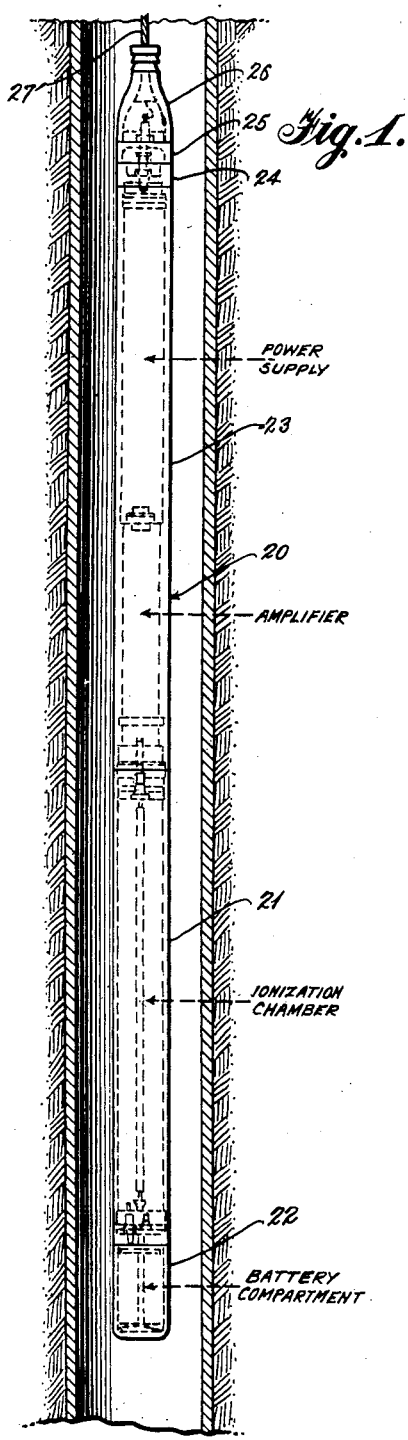
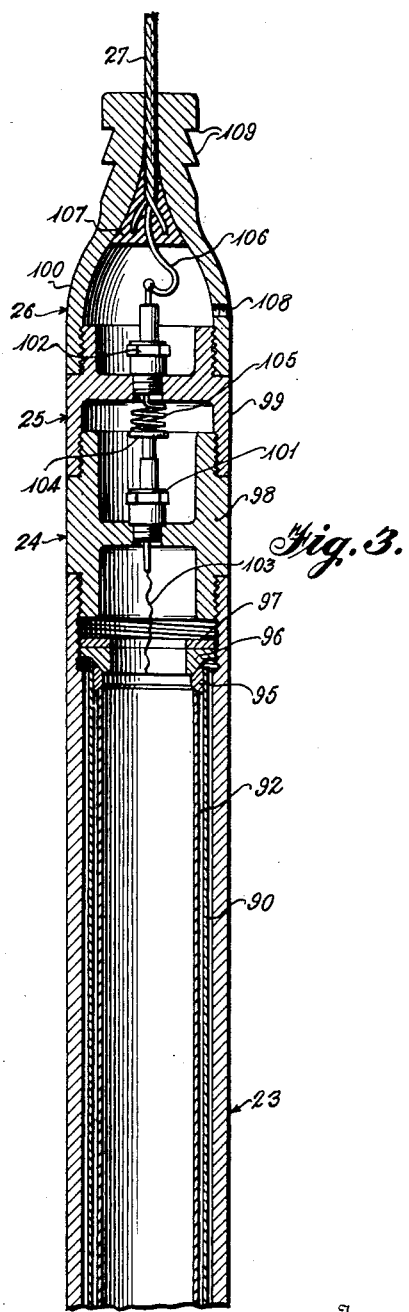
Inventors
SERGE A. SCHERBATSKOY,
GILBERT SWIFT,
ROBERT E. FEARON AND
JACOB NEUFELD
By Stevens and Davis
Attorneys May 16, 1944.　　S. A. SCHERBATSKOY ET AL　　2,349,225
WELL LOGGING INSTRUMENT
Filed Sept. 15, 1941　　9 Sheets-Sheet 2

Inventors
SERGE A. SCHERBATSKOY,
GILBERT SWIFT,
ROBERT E. FEARON AND
JACOB NEUFELD
By Stevens and Davis
Attorneys

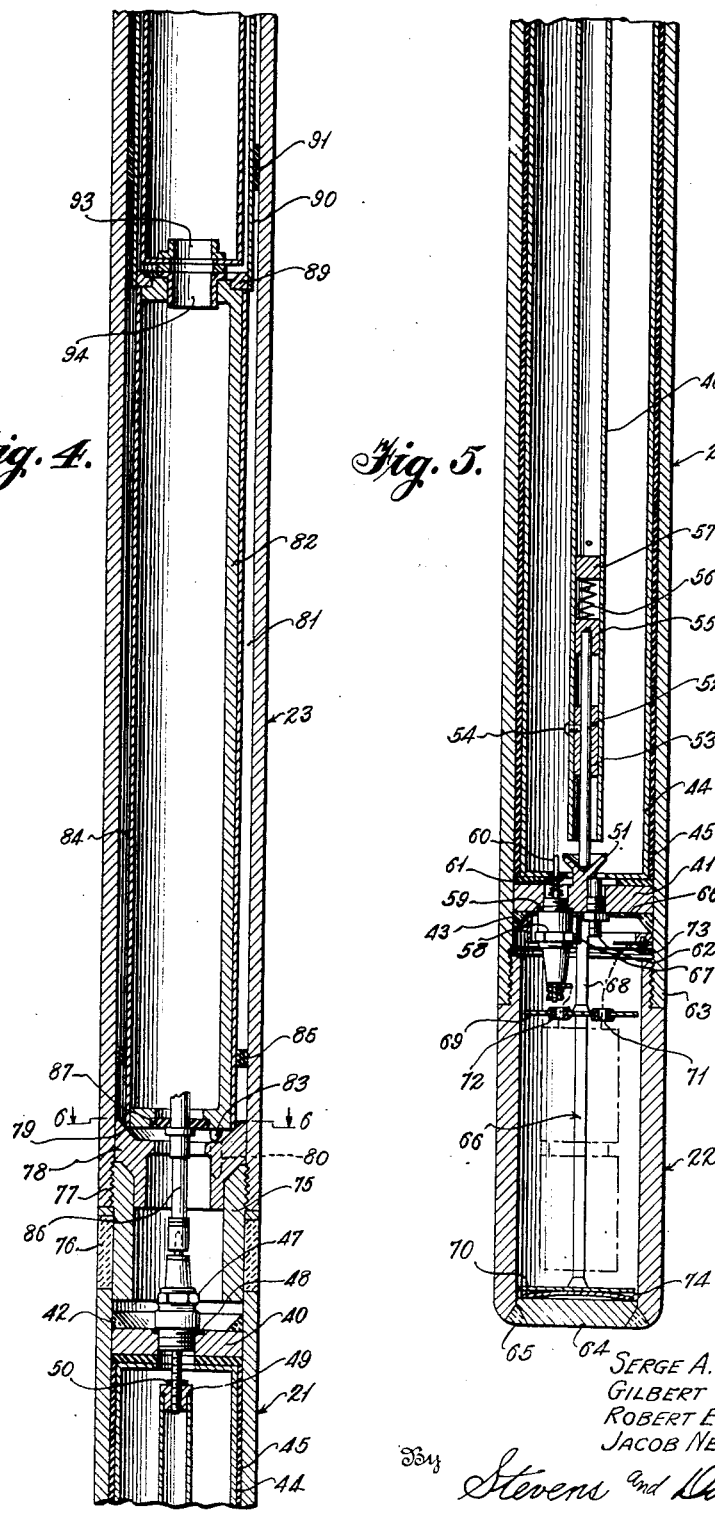

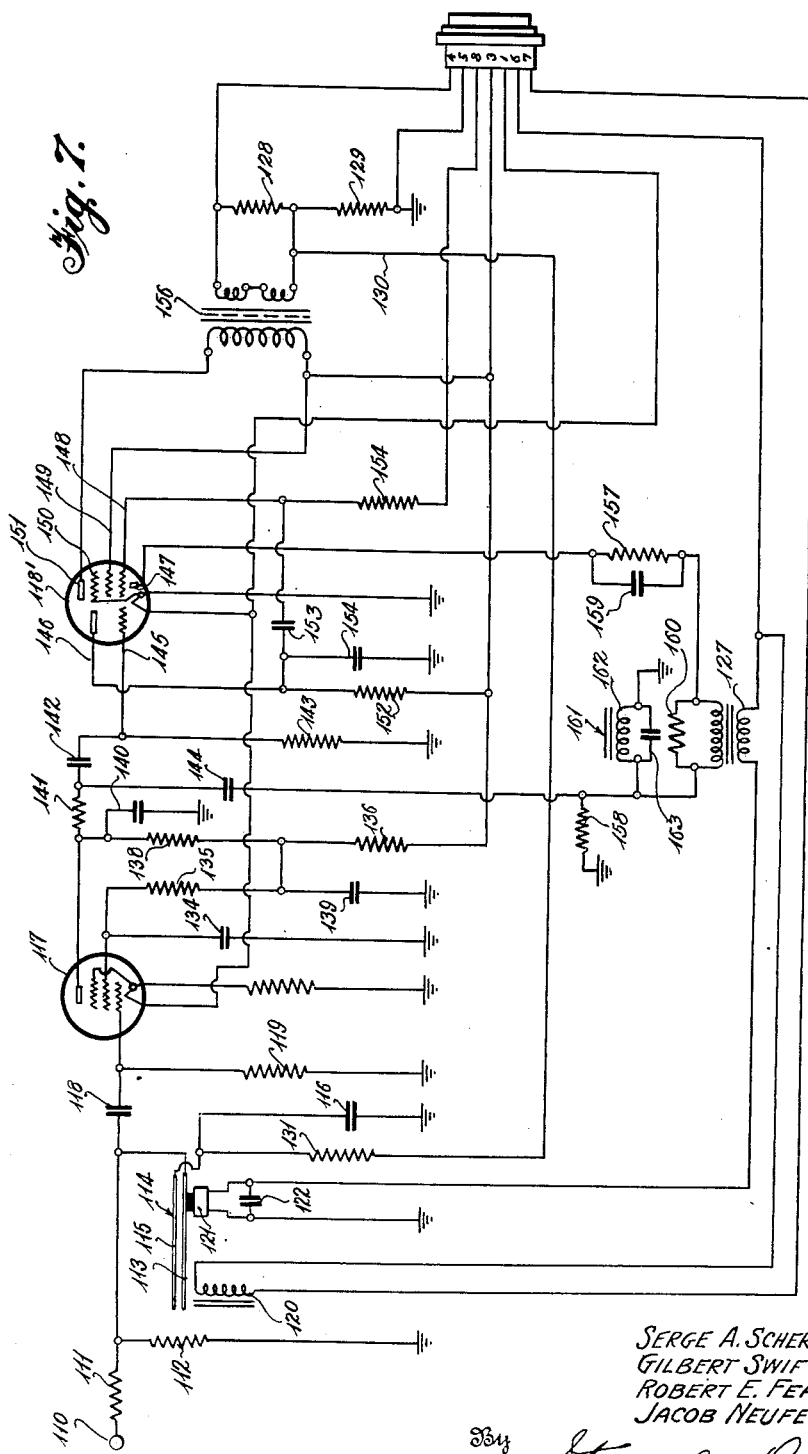

May 16, 1944.  S. A. SCHERBATSKOY ET AL  2,349,225
WELL LOGGING INSTRUMENT
Filed Sept. 15, 1941   9 Sheets-Sheet 5
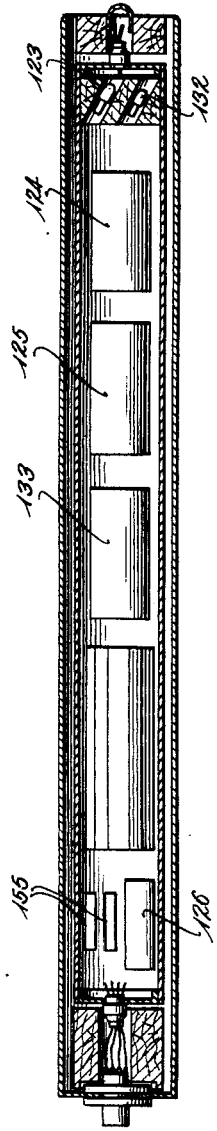
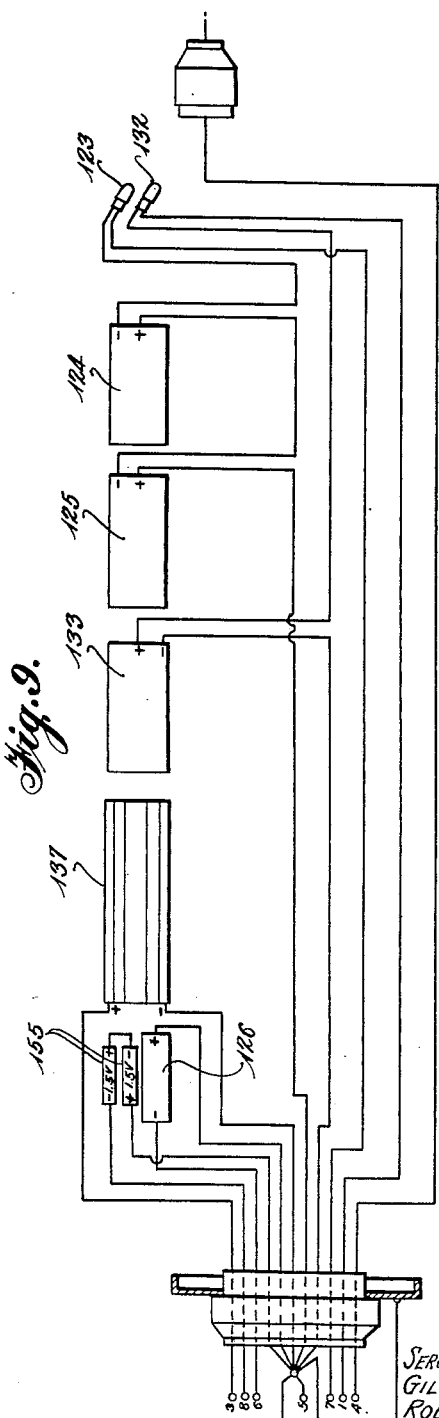
Inventors
SERGE A. SCHERBATSKOY,
GILBERT SWIFT,
ROBERT E. FEARON AND
JACOB NEUFELD
By Stevens & Davis
Attorneys

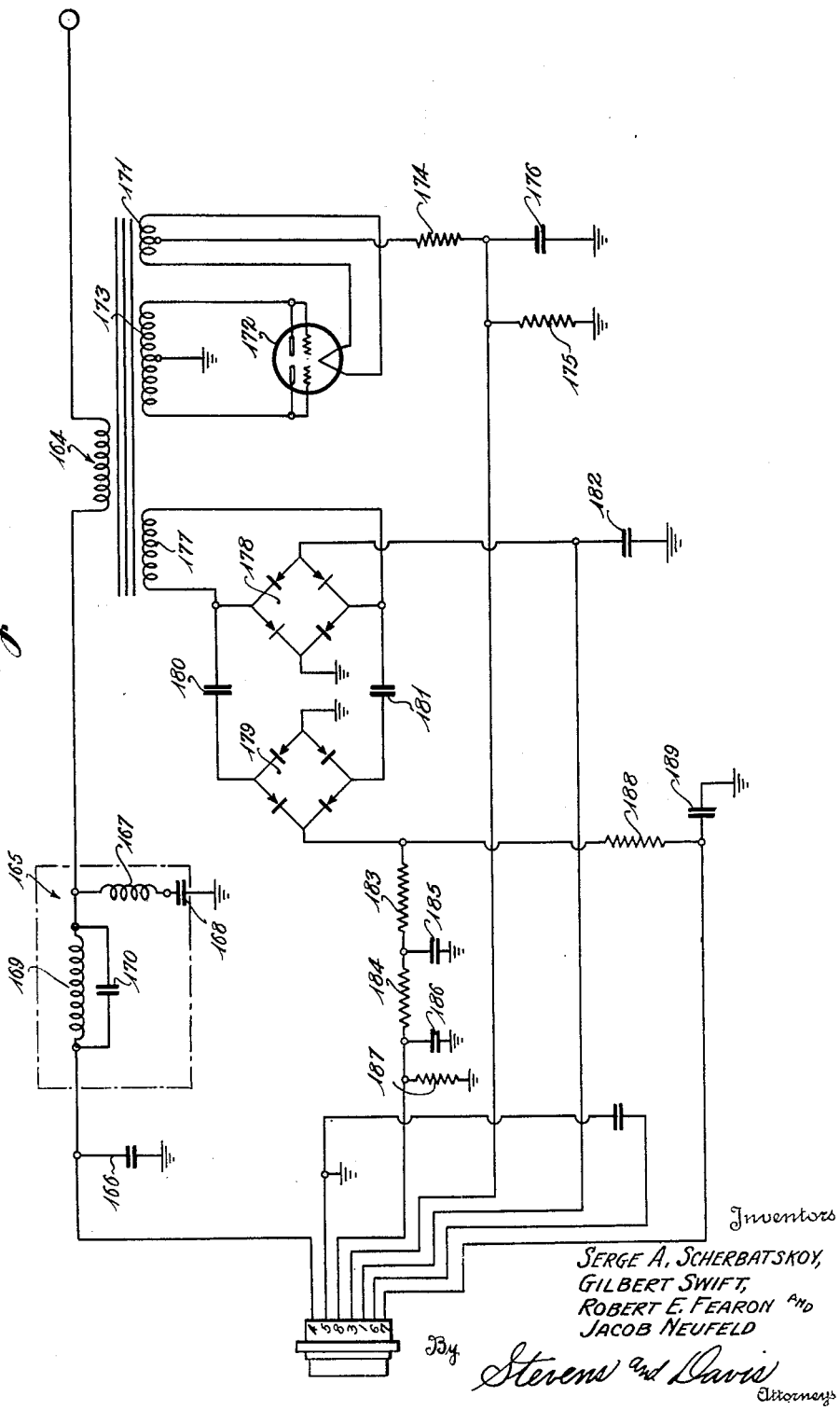

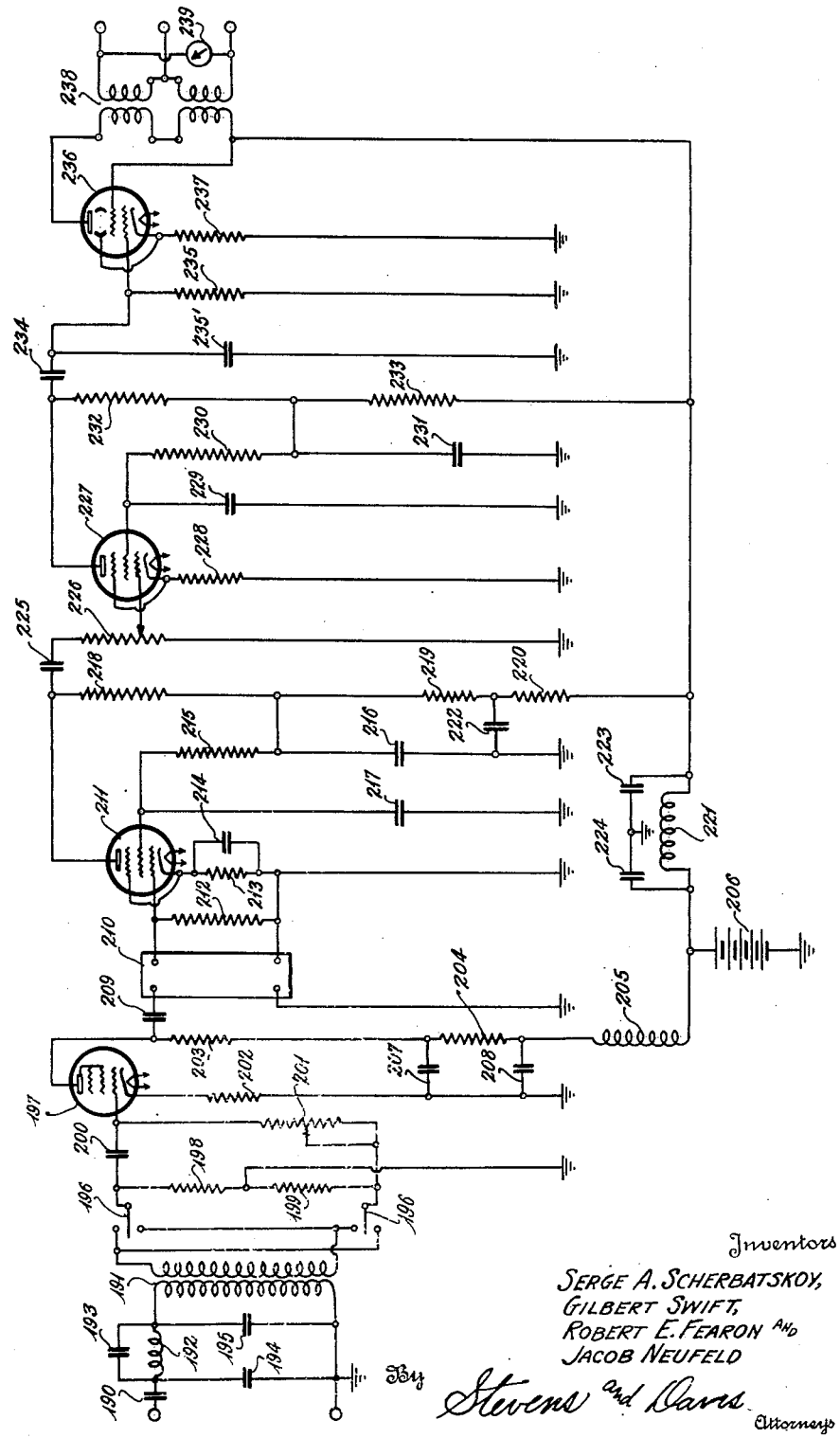

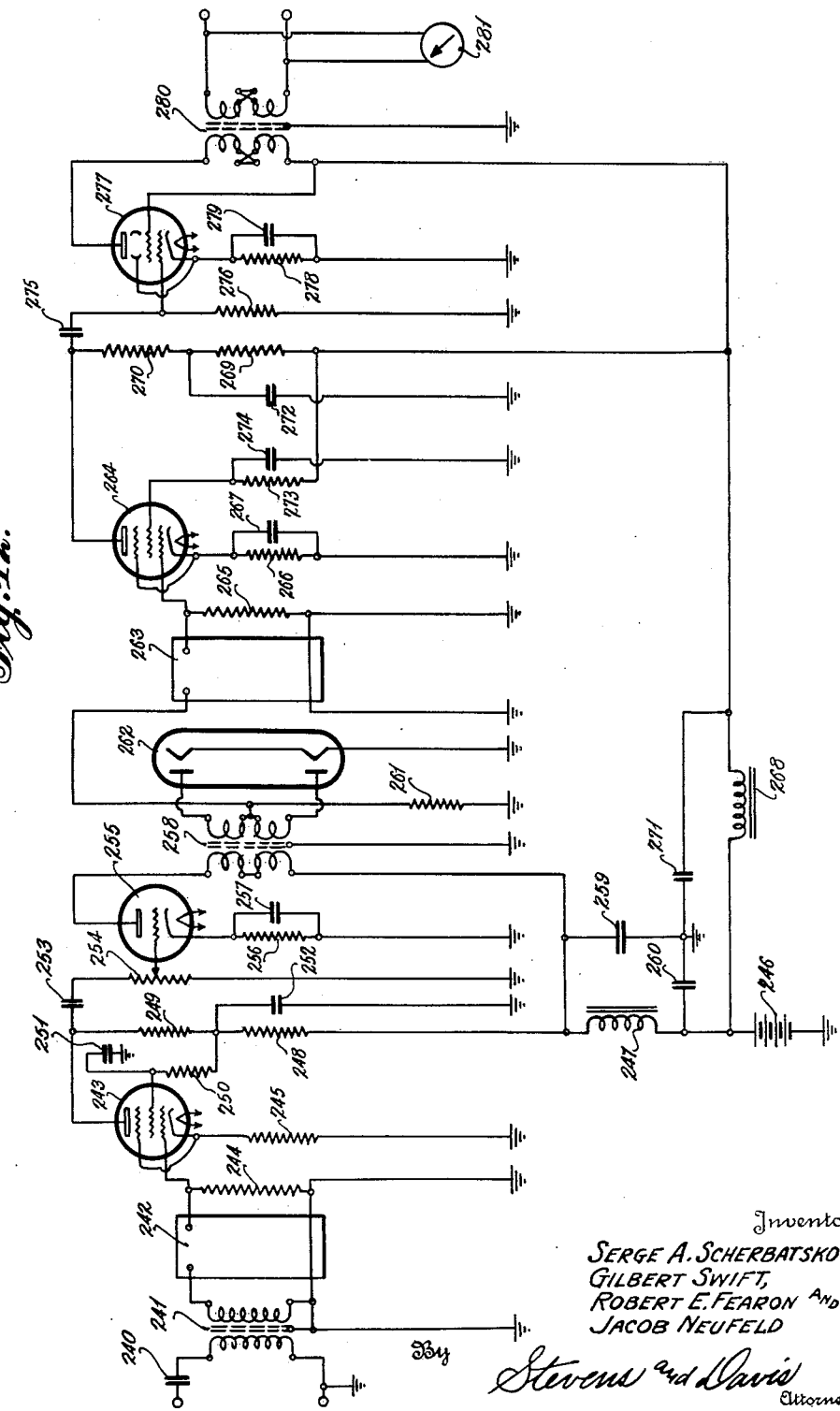

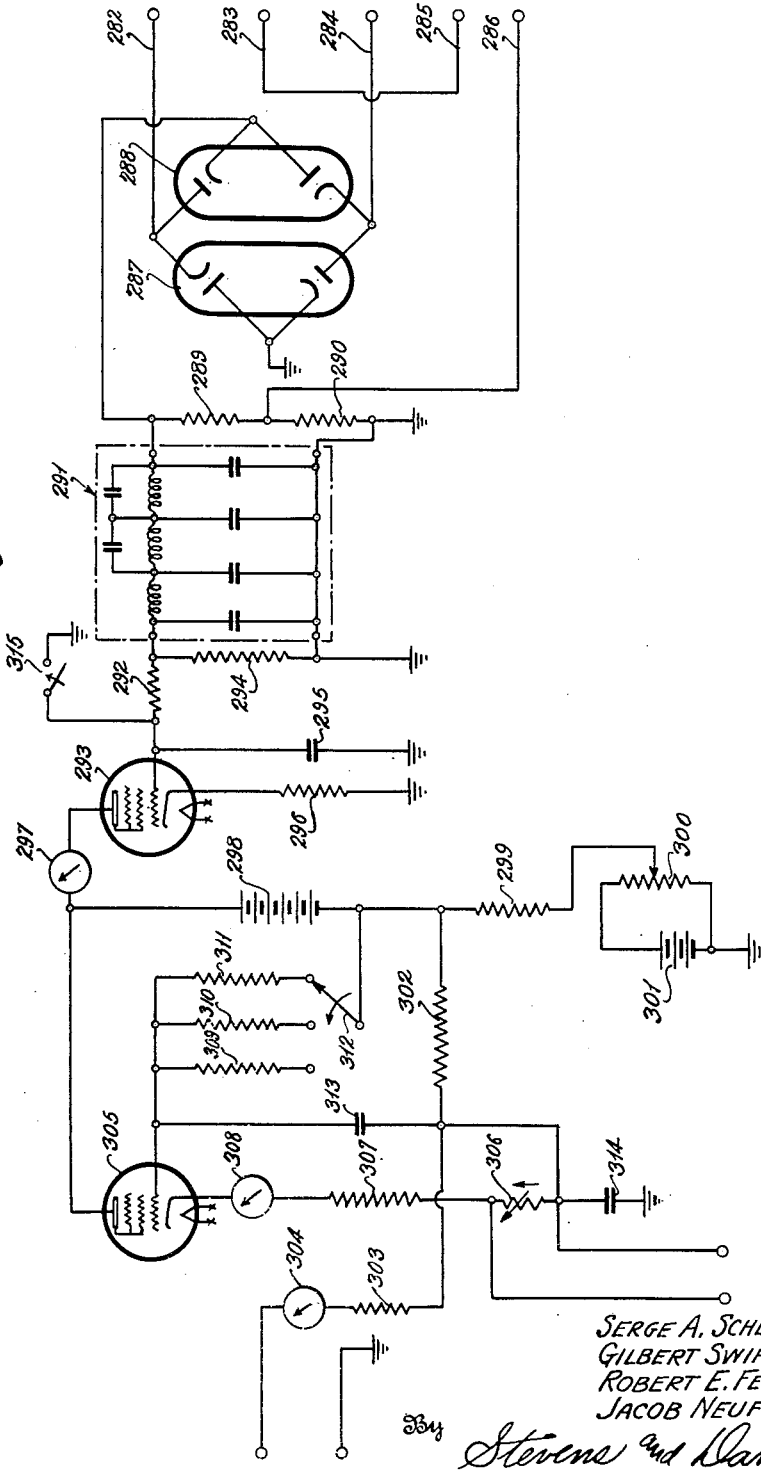>

Patented May 16, 1944

2,349,225

UNITED STATES PATENT OFFICE 2,349,225

WELL LOGGING INSTRUMENT

Serge Alexander Scherbatskoy, Gilbert Swift, Robert Earl Fearon, and Jacob Neufeld, Tulsa, Okla., assignors to Well Surveys, Incorporated, Tulsa, Okla., a corporation of Delaware Application September 15, 1941, Serial No. 410,954

21 Claims. (Cl. 250—83.6)

This invention relates to geophysical prospecting and more particularly to well logging by the measurement of gamma rays or other radiations at various depths in drill holes or the like.

It has already been found advantageous to lower various types of measuring equipment into wells or other openings in the earth and to make a series of measurements therein that will provide a parameter of something related to the structure surrounding the well bore, in correlation with depth. These parameters are commonly referred to as "well logs." They are generally formed by making a continuous series of measurements of some kind in a well bore over a continuous range of depths and plotting the measurements graphically so as to give a continuous curve of depth versus the magnitude of the characteristic being measured.

There are many examples of the making of this kind of measurements, probably the most common being the measurement of the resistivity of the strata at various depths. The temperature, natural potentials of the strata and many other characteristics have also been measured in a similar manner. Recently, it has been found that radioactive radiations emanating from the strata, for example, gamma rays can be measured and correlated with depth in a similar manner and that there are many advantages to measuring them as indications of the nature of adjacent geological formations.

Gamma rays, neutrons and the like penetrate metal with relatively little difficulty and hence measurements of these radiations may be made even in a well that has already been lined with a steel casing and with an instrument which itself is enclosed in a steel capsule. Furthermore, almost all natural substances are radioactive and the extent of their radioactivity is a good index of their nature. Still further, not only the intensity but also the nature of the radiations are different when they come from different formations and determinations can be made of the differences in types of radiation as well as the differences in intensity. Then too, radiations may be artificially introduced into the surrounding strata by a source of radiation lowered into the drill hole and the effect or action of these radiations may be determined.

Work on the detection of radiations of this type has already passed beyond the experimental stage and measurements have actually been made through casing, on a commercial scale, of the naturally emitted gamma radiations of the surrounding formations. The information thus obtained has proven very valuable as an indication of the nature of surrounding geological formations.

Despite the successful measurement of gamma radiations, many difficulties have been encountered with the equipment originally proposed for the purpose. The original instruments were not as sensitive as was desired. The capsules in which they were enclosed were not strong enough to withstand the terific pressures encountered at great depths, could not be sealed tightly enough to prevent leakage, and were too large to be inserted in a hole of small diameter. The detector and other equipment lowered into the well were not sturdy enough to withstand the mechanical shocks received in normal field use. The power supply was not steady enough. The measurements could not be accurately transmitted to the surface. The instrument could not readily be assembled and disassembled so that building and repairing it were long tedious processes.

The purpose of the present invention is to eliminate as many as possible of the objectionable features from the equipment originally proposed for radiation well logging and to provide an instrument to be lowered into a well, and surface equipment to go with it, which will be highly sensitive, be very accurate, be so sturdy that it will not be injured by any of the things that may normally happen in the field use of the instrument and that will be so constructed that the component parts may be readily removed for repair or replacement.

The ionization chamber which receives the radiations from the surrounding strata has, to this end, been arranged to occupy the full cross-section of the instrument. It comprises a steel shell which at once forms a portion of the outer casing of the instrument and at the same time, the outer wall of the ionization chamber. Within this shell and insulated therefrom is an outer cylindrical electrode and an inner rod-like electrode. An electrical connection from each is carried through an end wall of the chamber by an insulated conductor very much like the ordinary automobile spark plug. In fact, automobile spark plugs have been slightly altered and used for this purpose. The inner electrode is shock mounted and insulated from the casing by a quartz rod spring mounted in one end of the electrode and by one of the spark plug like structures at the other. Such a structure provides an ionization chamber of considerable volume without making necessary a very large outside diameter for the instrument and at the same time permits the reduction of leakage current so that very fine and at the same time very accurate measurements may be made. As will be seen later, the electrical connection between the battery which applies potential across the electrodes, the electrodes themselves, and the casing, are such that what little leakage there is tends to be between the electrodes and the casing instead of between the electrodes themselves and this leakage is ignored by the measuring circuit.

Removably connected to the section of the casing which forms the ionization chamber there is at least one more section of casing of the same outside diameter and within this section of casing are positioned two more units of the instrument. The first, which is positioned directly above the ionization chamber, is a unit which measures the flow of current in the ionization chamber and sends an appropriate electrical signal to the surface of the earth. The second, which is positioned above the first, contains a source of electrical power for operating the measuring circuit. It may also contain a source of power for applying voltage across the electrodes of the ionization chamber, or, alternatively, this source of power may be contained in a separate section of the instrument casing removably attached below the ionization chamber.

In order to expedite the removal of the two units of the instrument which are placed above the ionization chamber, the lower of these two units is formed to extend from the ionization chamber to a point adjacent the top of the section of casing within which it is contained. The upper portion of this unit, however, is merely a hollow shell in which the second or upper of the two units may be positioned. Means are then provided for sealing the upper end of the casing against the entrance of fluids from the surrounding well bore, connecting the casing to a supporting cable, and making electrical connections to the conductor inside this cable so that current may be transmitted to and from the surface through a single conductor inside of the cable.

In order that the ionization chamber may be as sensitive and as accurate in its indications as possible, and in order to minimize the errors that may occur in the transmission of the indicating signals to the surface of the earth a "null" type of measuring circuit has been devised. Accordingly, the outer electrode of the ionization chamber has been connected through a battery or other source of voltage to the casing and the inner electrode has been connected through a relatively high resistance resistor also to the casing. By connecting the outer electrode through the battery to the casing the major part of any leakage that occurs will be between the outer electrode and the casing and this will not affect the current flowing through the resistor.

Originally, the voltage drop across the resistor was used, directly, to govern an amplifier, but this has been changed, a second resistor has been inserted and an arrangement made so that current from apparatus on the surface of the earth can pass through this second resistor to make the potential drop across it equal to that across the first resistor when the system is in a state of balance, so that there is then no voltage across the two resistors when placed in series, as they are in the present arrangement.

In order to make this system an operative null system, any overall potential developed across the two resistors is used to operate, through a capacitative commutator, an alternating current amplifier, which sends its signals to the surface of the earth, where these signals cause a readjustment in the current sent through the balancing resistor. As soon as the state of balance is reached the signal to the surface ceases, the system is in balance and a record of the current being sent to the balancing resistor is recorded as an indication of the gamma radiation at the particular point in the well.

It has been found desirable to commutate the current sent to the surface and amplify this current by an alternating current amplifier in order to prevent the usual drift of a direct current amplifier from affecting the accuracy of the measurement. This has necessitated some arrangement whereby the surface equipment can be made to adjust the balancing current in the proper direction, since an unbalance in either direction will cause an alternating current signal to be sent to the surface. To this end a second alternating current signal is sent to the surface from the operating circuit of the capacitative commutator and the phase relation between this second current and the signal current are there used to determine the direction in which the balancing current must be adjusted in order to balance the circuit.

As can be seen from the foregoing description, the arrangement so far described necessitates the sending to the surface of two different alternating currents and the return to the instrument of at least one direct current for balancing purposes. Multi-conductor cables however are both expensive and difficult to maintain and an arrangement has therefore been devised by which the two alternating currents may be made to have different frequencies, transmitted over the same cable, and at the same time not interfere with the transmission of the direct current over the same cable. This is accomplished by a proper arrangement of frequencies and filtering circuits. The signal current is ordinarily caused to have a frequency of around 74 cycles, the phasing current, a frequency of around 592 cycles and the balancing current is substantially direct current.

If batteries are used as the entire source of power within the instrument, then it is not necessary to conduct any other current over the single conductor cable that supports the instrument, but when it is desired to supply power from the surface of the earth to operate either the measuring circuit, the ionization chamber or both then a current which is of still a different frequency may be sent down into the well over the same cable and separated in the measuring instrument from the other currents by appropriate filters. It has been found that a current having a frequency of 5 kilocycles is satisfactory for this purpose.

When batteries are used to supply the power to the measuring circuit they are contained in the upper of the two units above the ionization chamber and connected through a plug and socket arrangement to the unit which contains the measuring circuit. The measuring circuit is similarly connected by a plug and socket arrangement to the ionization chamber. It has been found particularly desirable in case batteries are used to place in the battery compartment one or more switches which are gravity actuated so that when the unit is removed from the well and laid on its side the batteries will be disconnected and the measuring circuit thereby stopped from operation.

When power is to be sent from the surface, appropriate filters and rectifiers are contained within the upper unit of the measuring instrument so that the power from the surface is properly separated from the other currents in the supporting cable, rectified, filtered as necessary, and the proper voltages applied to the various parts of the measuring circuit. Such a power pack arrangement may be arranged to supply voltage across the ionization chamber as well as to the measuring circuit but ordinarily this will not be found to be desirable and the ionization chamber will be supplied with voltage by a separate battery.

At the surface of the earth the supporting cable for the measuring instrument passes over a wheel which is connected through either an electrical or a mechanical transmission system to a recorder so that the recorder tape moves as the measuring instrument moves up and down in the well. The supporting cable is then wound on to a cable drum through which connections are made by slip rings and brushes from the center conductor and the cable itself to a series of three panels interconnected so that one panel detects and amplifies the signal current, another detects and amplifies the phasing current and the third compares the resultant currents and properly adjusts the balancing direct current sent back to the measuring instrument, at the same time actuating the recorder so that it records the amount of balancing current sent back to the well. In addition, a source of power may be connected into the surface circuit to supply power to the instrument in the well. This of course is used only in case a power pack is used in the well instead of batteries.

Numerous additional details of the device of this invention and numerous advantages not heretofore mentioned will be evident from the following detailed description of this device and from the appended drawings. It is to be understood, however, that while the device illustrated in the drawings is the preferred form and many of its details form important parts of this invention, that the invention is not limited to the combination of all of the parts shown in the appended drawings or described in the following detailed description, or even to the exact embodiment of any one of the many details.

In the drawings:

Figure 1 is an elevation, partly in section showing the measuring instrument as a whole, in the position in which it will normally operate;

Figures 3, 4 and 5 are sectional elevational views on a much larger scale than Figure 1, illustrating, when taken together, the more detailed construction of the measuring instrument;

Figure 7 is a circuit diagram of the measuring circuit of the instrument;

Figure 8 is an elevational view partly in section of the battery unit of the measuring instrument;

Figure 9 is a wiring diagram of the same battery unit;

Figure 10 is a wiring diagram of a power supply unit for the measuring instrument;

Figure 11 is a wiring diagram of the panel of surface equipment which selects and amplifies the signal current from the measuring instrument;

Figure 12 is a wiring diagram of the surface panel which selects and amplifies the phasing current from the measuring instrument; and Figure 13 is a wiring diagram of the surface panel which compares the measuring current and the phasing current and adjusts the balancing current and operates the recorder.

Figure 2:
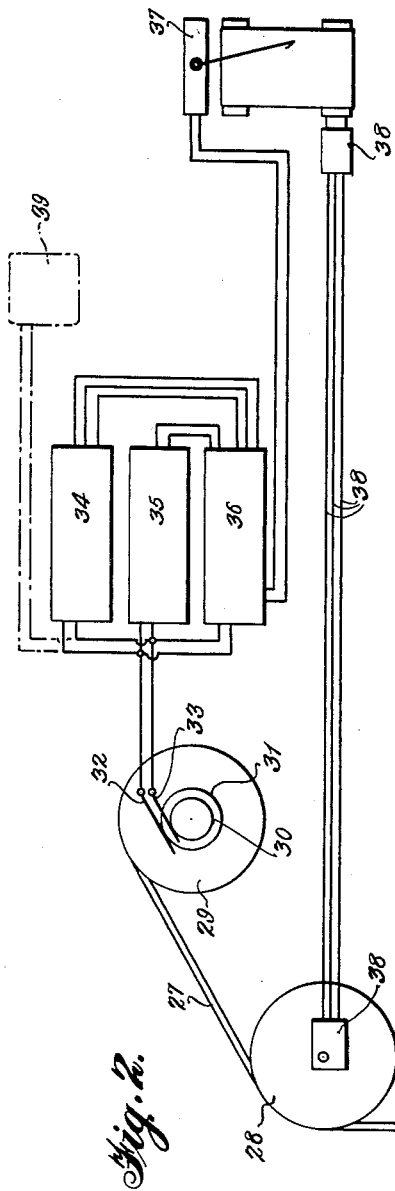
Figure 2 is a diagrammatic illustration of the surface equipment which together with the instrument of Figure 1 forms a complete apparatus.
Figure 6:
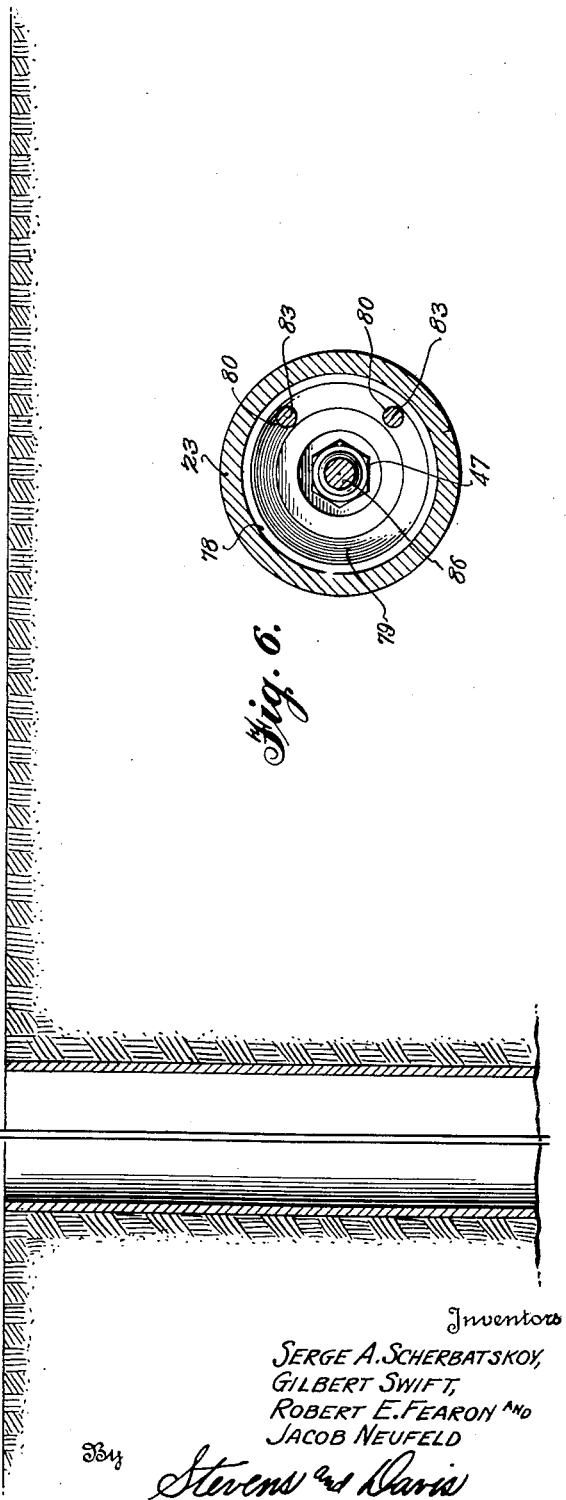
Figure 6 is a sectional view of the measuring instrument taken on line 6—6 of Figure 4.

As specifically illustrated in Figures 1 and 2 the measuring instrument 20 comprises an elongated steel tube made up of several sections. Starting with the section 21 which forms at once the outside wall of the instrument and the outer wall of the ionization chamber there is attached to the lower end of this section a second section 22 of the same diameter, which section is sealed at its lower end and contains batteries which apply potential across the electrodes of the ionization chamber. Above the ionization chamber section 21 is a third section 23, also of the same diameter as the ionization chamber and this section encloses the measuring circuit unit and the power supply unit of the device. Above the third section 23 are two short sections 24 and 25, each of the same diameter as the remainder of the casing, and above these is a member 26 specially constructed to receive and hold the lower end of a supporting cable 27.

On the surface of the earth is positioned a measuring wheel 28 over which the cable 27 passes to a cable drum 29 driven by a source of power not shown to raise and lower the instrument in the well. Connections inside of the cable drum 29 carry the currents from the cable 27 and the conductor within it to slip rings 30 and 31 from which they are picked up by brushes 32 and 33 and carried to the amplifying and controlling panels 34, 35 and 36. The amplifying panel 34 selects and amplifies the incoming signal which indicates the state of balance of the measuring circuit in the well, the amplifying panel 35 selects and amplifies the phasing current from the well and the control panel 36 compares the amplified signal current and the amplified phasing current, makes the necessary correction to the balancing current being sent back to the well and actuates a recorder 37 in accordance therewith. The recorder 37 has its tape driven by a mechanical or electrical transmission system 38 from the measuring wheel 28. Thus a continuous log is made of the gamma radiations encountered versus the depth. A source 39 of 5 kilocycle power may be connected into the cable through the brushes 32 and 33 as shown in dotted lines in Figure 2.

Considering now Figures 3, 4, 5 and 6 to obtain a more detailed understanding of the mechanical structure of the measuring device we find that the ionization chamber is formed by the steel shell 21 which is closed at its opposite ends by metal discs 40 and 41, preferably of steel and welded into place by welds 42 and 43 respectively.

Within the chamber so formed is positioned an outer electrode 44 insulated from the wall of the chamber by a good insulating material 45. It has been found that glass wool fabric impregnated with a synthetic resin is very satisfactory for this purpose.

In the center of the ionization chamber a second electrode 46 is positioned. This electrode is tubular in shape and supported at its top end from a sparkplug-like connection 47 which extends through the top 40 of the ionization chamber. This connector can be described as an ordinary automobile sparkplug with the outer point removed and the inner point lengthened and threaded. The connector as a whole is threaded into the top 40 of the ionization chamber in the same manner that it would be threaded into the head of an automobile engine and is provided with a gasket 48 which prevents leakage of gas around it. At the lower threaded end of the central conductor it carries a plug 49 threaded thereon and locked into position by a locknut 50. The upper end of the tubular central electrode 46 of the ionization chamber fits over this plug 49 and is attached thereto either by reason of the tightness of its fit or by solder, brazing, welding, screw threads or any other expedient means.

The lower end of the tubular central electrode 46 is supported by a cup-like structure 51 which forms a part of the lower end member 41 of the ionization chamber. In this cup member 51 is received the lower end of a quartz rod 52 extending upwardly into the center of the tubular electrode 46. Inside of the tubular electrode the quartz rod is slidably received in a guide member 53 held in position in the tubular electrode by a machine screw 54. The upper end of the quartz rod which passes on through the guide member is received in a slider 55 which is free to slide up and down in the tubular electrode 46 but is yieldably urged downward by a spring 56 which presses at its lower end against the slider 55 and at its upper end against a block 57 fixed within the tubular electrode. Thus the central electrode is well insulated from the casing and the outer electrode and at the same time so mounted that it is not likely to be broken loose from its support by shocks incident to the handling or use of the instrument.

The outer electrode 44 is supported by the insulating material which insulates it from the case and is connected outside the chamber through a second sparkplug-like connector 58, mounted in the bottom closure member 41 of the ionization chamber and provided with a gasket 59 in much the same manner as the connector for the central electrode. This connector, like the one for the central electrode, has no outer point and has an elongated inner point 60 which makes contact with the electrode in the ionization chamber. It is further provided with a helical spring 61 which is attached at its lower end to the central contact point 60 and presses at its upper end against the outer electrode 44 of the ionization chamber, to insure good contact. A valve 62 is also provided in the bottom member 41 of the ionization chamber so that the ionization chamber may be filled with the appropriate gas at the appropriate pressure. Argon at 1000 lbs. per sq. in. has been found very satisfactory for use in the ionization chamber.

The side walls 21 of the ionization chamber extend somewhat below the bottom closure member 41 and are provided internally with screw threads so that another section of the instrument may be attached. This section 22 is a container for the batteries that apply potential across the electrodes of the ionization chamber. It consists of a relatively short length of steel tubing of the same outside diameter as the ionization chamber. The top end of this tubing is cut away and externally threaded at 63 to fit the threads in the lower end of the ionization chamber. It is closed at the bottom by a disc shaped member 64 welded into place by a weld 65.

In order that the batteries may be expediently placed in this compartment and the proper connections made, a rack 66 is provided. This rack includes a flanged positioning plate 67 so formed as to fit against the bottom plate of the ionization chamber and around the sparkplug-like connector 58 and the valve 62. From this plate extend two strap-like members 68 which carry between them a pair of cross plates 69 and 70 one of which is to be above the batteries and the other of which is to be below the batteries when they are placed in position. The batteries, shown in dotted lines in Figure 5, are then placed in position between the straps 68 and between the plates 69 and 70 and simply tied or taped into position.

The upper plate 69 is provided with openings 71 and 72 through which connections from the batteries may pass and as can be seen these openings are surrounded by insulation so that the wires will not short circuit. The connection from the positive end of the battery to the connector 58 is shown in dotted lines as is also a connector from the negative side of the batteries to a lug 73 on the ionization chamber casing. A spring pressure plate 74 is also provided, which plate is mounted on the lower end of a battery holding frame and arranged to press against the lower end of the casing for the battery compartment when that casing is in place. Thus it prevents the battery supporting structure from vibrating or shaking when the device is assembled.

Above the ionization chamber as has been said, is the third section of steel tubing 23 which encloses the measuring and power supply units. For the purpose of attaching this section of tubing, the side walls of the ionization chamber are arranged, as at the bottom of the ionization chamber, to extend some distance beyond the top closure member 40 of the ionization chamber. A short length of tubing 75 a little larger in diameter than the inside diameter of the ionization chamber case is then machined so that its lower end will slip into the ionization chamber case and welded into place therein by spot welds 76.

The upper end of this short piece of tubing carries screw threads 77 and the lower end of the next higher piece of tubing 23 carries internal screw threads at its lower end so that it may be screwed tightly in place atop the ionization chamber. Within the lower end of this upper piece of tubing 23 is positioned an annular member 78 shaped to fit closely over the short piece of tubing 75 and having a conical section 79 on its upper face so as to position the measuring unit that is to be placed therein. Furthermore, the annular member 78 has a pair of holes 80 drilled longitudinally in it to receive a pair of studs from the measuring unit so as to fix the position of the measuring unit still further.

The measuring unit, designated generally as 81, comprises a long cast metal frame 82 which passes lengthwise along one side of the measuring unit and includes a substantially round plate at each end. At the lower end two positioning studs 83 are mounted and arranged so that they will enter the holes 80 in the annular plate 78 when the measuring unit is lowered into position. Surrounding the frame 82 is a metal cylinder 84 which encloses the frame and the parts of the measuring circuit. To simplify the drawings and explanation the parts of the measuring circuit have not been shown, although the circuit diagram for these parts will be found in Figure 7.

Fixed to the outside of the cylindrical cover 84 is a soft positioning ring 85 which serves to assist further in positioning the measuring unit in the outer casing and preventing vibration of the unit within the case.

Connection is made between the central electrode of the ionization chamber and the measuring circuit through the connector 47, already described, and through a second connector 86 which is mounted in an insulator 87 in the frame of the measuring unit. The upper end of the connector 47 is arranged as a plug and the lower end of the connector 86 as a socket so that when the measuring unit is slipped into place in the casing the plug and socket will automatically fit together and give the desired connection. Preferably, the plug and socket connection are such that the contacts are spring pressed against each other to insure a firm, low resistance connection at all times.

At the top end of the measuring unit proper a small annulus 89 is affixed to the frame 82 and a sleeve 90 is affixed to this annulus and extends upward for a sufficient distance to enclose the power unit. A resilient positioning ring 91 is preferably attached to the outside of this ring near its lower end so as to still further aid in positioning the measuring unit in the outer casing.

The power unit is enclosed in a cylindrical case 92 of somewhat smaller diameter than the inside of the sleeve 90 and is lowered into the sleeve 90 either before or after the measuring unit is placed in the outer casing. It carries at its lower end a plug connection 93 which cooperates with a socket connection 94 in the upper end of the measuring unit proper. The details of this plug and socket connection have been omitted to simplify the drawings.

Above the top end of the power unit and the shell 90 which surrounds it and extends a little above it, the outer casing 23 is internally threaded. In order to hold the power and measuring units firmly in place, a double tapered annulus 95 is arranged to fit just within the surrounding sleeve 90 and press downwardly and inwardly against the top of the power unit 92. This annulus is held in place by a second annular ring 96 which is tapered to press outwardly against the first ring and threaded so that it can be screwed down inside the outer casing. An externally threaded lock nut 97 secures the second annulus in place.

The next problem is the sealing of the top of the instrument and the anchoring of the supporting cable therein. This is accomplished by screwing a double male plug 98 into the top of the upper casing section 23, covering this with a female-male plug 99 and screwing an anchoring member 100 onto the top of the male-female plug. The electrical connection is carried through the double male plug 98 and through the male-female plug 99 by sparkplug-like connectors 101 and 102 respectively. The connection is made from the power supply unit to the lower of these by a flexible connection 103 and between the two connectors themselves by a plate 104 fixed to the top of the lower one and a helical spring 105 fixed to the bottom of the upper one and arranged to press against the plate. The internal conductor from the supporting cable, which is designated by the numeral 106 is connected directly to the top of the connector 102.

The strands of the cable 27 are spread within the anchoring member 100 and imbedded in lead 107. The anchoring member 100 is then filled with oil through an opening 108 and closed by a set screw. The anchoring member 100 is shaped at its upper end so as to present teeth 109 which may be grasped by a fishing tool should it become impossible to remove the measuring instrument from the well by ordinary means.

Reference will now be had to Figures 7 and 9 for the purpose of describing the measuring and power supply circuits. According to these figures the central electrode of the ionization chamber is connected through contact 110 and resistors 111 and 112 to ground. Thus with the outer electrode of the ionization chamber connected through a battery or other source of power to ground a complete circuit is had and the flow of current in the circuit depends upon the gamma radiation reaching the ionization chamber and thus changing its resistance.

One plate 113 of a capacitative commutator 114 is connected to this circuit at a point between the two resistors and hence as the current flow in the circuit varies the potential of that plate relative to ground potential will vary as the voltage drop across the resistance 112 varies. The other plate 115 of the commutator is connected to ground through a condenser 116 to rid it of any currents of unwanted frequencies and its potential is controlled from the surface of the earth so that it may be brought to the same potential as the first mentioned plate 113. The first plate 113 is also connected to the control grid of a thermionic amplifying tube 117 through a condenser 118 and a resistor 119 is placed between the grid of the vacuum tube and the ground so that no permanent charge will remain on the grid. The capacity of the commutator 114 is periodically varied at a constant frequency by means to be hereafter described.

With the arrangement so far described and with a constant or slowly changing flow of current in the ionization chamber circuit and with the two commutator plates 113 and 115 at the same potential there will be no potential drop across the commutator and hence its change in capacity will produce no potential change across the grid of the amplifier tube. The constant or slowly changing potential across the resistor 112 will not affect the grid of the amplifying tube because the resistor 119 will allow current to pass sufficiently rapidly to keep the grid of the tube at ground potential. If, however, the plate 115 of the commutator is not kept at the same potential as the plate 113 then the variation in capacity of the condenser-commutator will vary the potential on the plate 113 and since this variation will take place at the frequency of variation of oscillation of the commutator it will be sufficiently rapid to cause an alternating current to be impressed on the grid of the tube 117 so that a signal will be sent out from that tube.

The variation of capacity of the condenser-commutator is produced by causing one of the plates 113 to act as an armature in a buzzer type of circuit comprising a solenoid 120, a carbon button 121 and batteries 124 and 125 both in the power pack, all connected in series. When the carbon button is compressed by motion of commutator plate 113 away from the solenoid 120 the current from the battery increases, thus tending to return the movable plate 113 to its former position. As the plate returns the pressure on the carbon button is reduced thereby reducing the current and lessening the pull of the solenoid on the moving plate. This increase and decrease of current, with attendant motion of the blade 113 is repeated cyclically at a rate determined largely by the mass and compliance of the moving blade which is adjusted to operate at about 74 cycles per second.

So that the circuit may be readily followed on the drawing the plug and socket connections on Figures 7 and 8 have had their terminals numbered 1 to 8 to correspond. Thus it will be seen that connections from the solenoid pass to the power supply unit through connections 6 and 7, and from connection 6 to ground through the primary of transformer 127 which will be hereafter described in more detail, in series with the carbon button 121. The condenser 126 is also connected from connection number 6 to ground. Between connection number 7 and ground are connected the batteries 124 and 125 in series with which is the gravity operated switch 123 which stops the operation of the device when the measuring instrument is removed from the well and laid on its side. It will be seen that direct current from the battery flows through the switch 123, the primary of the transformer 127, the carbon button 121 and the solenoid 120. The condenser 126 serves to broadly tune the solenoid winding to approximately 74 cycles per second, and condenser 122 which is connected directly across the carbon button serves to bypass any unwanted high frequency currents generated by motion of the carbon button. Thus it will be seen that the condenser plate 113 will be continuously oscillated and that a surge of current will pass through the primary of the transformer 127 at each oscillation. The phasing current previously mentioned is derived by use of this transformer.

As can be seen by an inspection of Figures 9 and 7 current from the central conductor of the supporting cable reaches the measuring circuit through the number 4 connection on the plug and socket which connects the measuring instrument and the power supply. The direct current component of the current in this conductor is permitted to pass to ground through the secondary of the transformer 156 and resistor 129 connected in series between it and the ground near the right hand end of Figure 7. The potential developed across this resistor is applied by connection 130 leading through a resistor 131 to the fixed plate 114 of the commutator 115. Preferably only a small resistance is used so that relatively large current may flow from the apparatus on the surface of the earth.

The amplifier tube 117 has its suppressor grid directly connected to its cathode and the cathode is heated by being connected through a resistor to ground and on the other side through the terminal 1 of the plug and socket arrangement to the power pack. In the power pack the terminal 1 is connected through a gravity cut-off switch 132 to a battery 133 the other side of which is grounded. The screen grid of the tube 117 is connected to ground through a condenser 134 and supplied with voltage through resistors 135 and 136, and plug connection 3 from a battery 137 in the power pack. Voltage for the plate of the tube 117 is taken from a point between resistors 135 and 136 through a resistor 138 and alterating current is by-passed to ground from the same point through a condenser 139. The plate of the vacuum tube 117 is also directly connected to ground through a condenser 140 of such a size that it will bypass currents of unwanted frequencies.

The signal from tube 117 is taken for further amplification through a circuit comprising a resistor 141, a condenser 142 and a resistance 143, to ground. The control grid of the next amplifying tube 118' is connected to this circuit between the condenser 142 and the second resistor 143. The source of phasing current is connected into this circuit through a condenser 14, at a point between the first resistor 141 and the condenser 142. Thus, both the phasing current and the signal current are placed on the control grid of amplifier tube 118'.

The amplifying tube 118 is of peculiar construction being in effect three tube units combined in one. The first of these three tube units, the operation of which is controlled by the control grid 145, just mentioned, is a three element tube comprising only a cathode, the control grid 145 and a plate 146. The second of these tube units is a diode rectifier comprising only the same cathode and a plate 147. The third of these tube units is a five element tube comprising the same cathode, a control grid 148, a screen grid 149 and a suppressor grid 150, which is connected directly to the cathode, and a plate 151.

The plate 146 of the triode amplifier is supplied with voltage from the plug connection 3 in the same manner as the plate of the first amplifier 117 through a resistor 152 and is connected through a condenser 153 to the control grid 148 of the pentode amplifier so that the output of the triode amplifier of the tube 118' is impressed on the control grid of the pentode amplifier of the same tube. Unwanted frequencies are carried off to ground through a condenser 154, also connected to the plate 146 of the triode.

The control grid 148 of the pentode amplifier is connected through a resistor 154 to the plug connection 8 which carries through to a pair of batteries 155 connected in series in the power unit. The positive end of these batteries is connected to ground. This furnishes the proper negative bias for the control grid of the pentode. The plate 151 of the pentode is connected through the primary of a transformer 156 to the plug connection 3 so that it obtains its voltage in the same manner as do the plates of the triode and the first pentode 117. The screen grid 149 of the pentode contained in the compound tube 118' is connected directly to the plug connection 3.

The secondary of the transformer 156 is connected across the resistor 129 already mentioned and this means that one side of the secondary is connected to the conductor that leads to the surface through the plug connection 4 and the other side of the secondary is connected to ground through the resistance 129. Thus amplified currents representing both the signals from the ionization chamber and the phasing current are sent to the surface of the earth.

The phasing current originates in the transformer 127 which, as has already been explained, has its primary connected in series with the carbon button 121 and which therefore receives a surge of current for each oscillation of the movable plate 113 of the commutator 114. The secondary of the transformer 127 is connected in a series circuit starting at the grounded cathode of the compound tube 118', continuing through the plate of diode 147 included in that tube, through the parallel combination of the resistor 157 and the condenser 159, through the secondary of the transformer 127 and through the parallel resonant inductance 162 and condenser 163. The combination of values of the resistor 157 and the condenser 159 are so chosen that the diode rectifier 147 passes a short current pulse at the peak of each cycle of the voltage induced in the secondary of the transformer 127 by the current flowing in its primary. The current pulses pass from the diode through the resonant combination of inductance 162 and condenser 163 where they excite a damped oscillatory wave train whose fundamental period is determined by the resonant frequency of these circuit elements. Since a pulse of current from the diode passes through this resonant combination for each oscillation of the movable plate 113, which oscillates at a frequency of 74 cycles per second a series of damped waves, recurring at a rate of 74 times per second is produced. The resonant frequency of the inductance 162 and the condenser 163 is chosen to favor the eighth harmonic of the 74 cycle pulses and therefore a series of damped wave trains having a period of 592 cycles, repeating at a rate of 74 per second is produced. These wave trains are thus the equivalent of a signal of 592 cycles per second, modulated in amplitude at a rate of 74 cycles per second, and are fed into the amplifier along with signal voltage from the tube 117 which is of 74 cycles frequency. Since the pulses of current in the diode determine the start of each wave train the phase relation of the 74 cycle envelope of this current bears a fixed time relationship to the movements of the commutator, the phase relation between the 74 cycle envelope of this current and the signal current can be later compared to determine the direction of unbalance of the signal current circuit.

When batteries are used as a source of power supply, the lead from the center of the supporting cable passes directly through the power supply compartment and through the plug connection 4 in the measuring circuit. There is a slight difference, however, as can be seen in Figure 10, when power is supplied to the unit from the surface of the earth. In the latter case the lead from the center of the supporting cable passes through a transformer 164 in the power unit, then through a filter 165, and is connected to ground through condenser 166 before it passes through the plug connection 4 to the measuring circuit. Power is taken through the transformer 164 for the operation of the power pack and the filter 165 and the condenser 166 prevent the passage of current of the power frequency into the measuring circuit. The filter 165 comprises a ground connection for the line through a choke 167 and a condenser 168 connected in series and also includes a choke 169 and a condenser 170 connected in parallel in the line.

From the transformer 164 power is taken through a full wave thermionic rectifier to supply the plate and screen voltages and through dry-disc rectifiers, preferably of the "selenium" variety to supply the lower voltages required for filaments and grid biases.

For this purpose the transformer has one center tap secondary 171 which serves to heat the filament of a full wave rectifier tube 172 and a second center tap winding 173 which serves to supply voltage to the plates and grids of that same tube. The center tap of the second winding 173 is grounded and the center tap of the first winding 171 is connected through a ballast resistor 174 to the plug terminal 3 which supplies the screen grid and plate voltages to the measuring circuit. Stabilizing resistor 175 connected between the plug terminal 3 and ground and a condenser 176 is also connected between the plug terminal 3 and ground to by-pass unwanted high frequency current.

A third secondary 177 of the transformer 164 supplies current across a pair of bridges each comprising four chemical rectifiers arranged to make a full-wave rectifier, usually of the "selenium" variety. The first of these bridges 178 is connected directly across the secondary 177 while the second of these bridges 179 is connected across the secondary through a pair of condensers 180 and 181, one of the condensers being placed in each connection to the bridge. The connections from the secondary of the transformer to each of the bridges is made at opposite corners and one of the remaining corners of each of the bridges is grounded. This leaves but one remaining corner on each bridge. The remaining corner on the first bridge 178 is connected directly to the plug connection 1 which supplies current to the filaments of the amplifier tubes. It is also connected to ground through a condenser 182 so as to by-pass any unwanted high frequency current.

The remaining corner of the second bridge 179 is connected through a pair of resistances 183 and 184, which are in series, to plug connection 8 which supplies grid bias to the control grid of the pentode portion of the second amplifier tube. High frequency currents are discharged to ground from this circuit by a pair of condensers 185 and 186, the first of which is connected from a point between the two resistors 183 and 184 to ground, the second of which is connected from a point beyond the second resistor 184 to ground. A stabilizing resistor 187 is also connected from a point beyond the second resistor 184 to ground.

Another connection from the last remaining corner of the bridge 179 leads through a resistor 188 to the plug connection 7 which supplies operating current to the commutator circuit. This circuit is also grounded through a condenser 189 at a point beyond the resistor 188.

At the surface of the earth, the connection from the conductor inside the supporting cable is carried to each of the panels 34, 35 and 36 and also to the source of power supply 39 if one is used, and the connection from the cable itself, that is the outside sheath of the cable, is grounded to each one of these units.

In the unit 34 which comprises the circuit for selecting and amplifying the signal current, the connection from the condenser inside the supporting cable and the ground connection are led through a condenser 190 and a filter circuit to the primary of a transformer 191. The filter circuit consists of a choke coil 192 placed in series with the incoming line, a condenser 193 across this choke coil and two additional condensers 194 and 195 between the incoming line and the ground connection, one before and one after the incoming line has passed through the choke coil. The various capacities and inductance are so proportioned that they tend to exclude direct current and currents of frequencies other than that of the signal current.

The output of the transformer 191 is connected to a double pole double throw switching arrangement 196 which serves to reverse the phase of the incoming signal. The phase is then further adjusted by another network and impressed on the control grid of a pentode amplifier 197.

This further adjustment is accomplished by placing a pair of resistors 198 and 199 in series across the reversing switch 196 and grounding the circuit at a point between them. A condenser 200 is then connected between one terminal of the reversing switch and the control grid of the tube 197 and a variable resistance 201 is placed between the other terminal of the reversing switch and the control grid. By adjusting this variable resistance 201 the phase of the incoming signal may be further shifted to place it exactly in phase with the phasing current.

The amplifier tube 197 is a pentode of the indirectly heated cathode type and since the heater current does not enter into the electrical circuit here involved its source is not shown. The cathode is grounded through a resistor 202 and the plate, screen and suppressor grid are all connected together and furnished with power through resistors 203 and 204 and a choke 205 all connected in series between this plate and a battery or other source of power 206. The negative terminal of this battery is grounded. The voltage supply circuit is also connected to ground through two condensers 207 and 208 at opposite ends of the resistor 204.

Current is taken from the plate circuit of the tube 197 through a condenser 209 and a filter 210 to supply voltage to the control grid of a second amplifier tube 211. The filter 210 is band pass filter passing only frequencies in the neighborhood of that of the signal current, that is to say around 74 cycles. A grid leak resistor 212 is placed across the output of this filter.

The amplifier tube 211 is, like the amplifier tube 197, a pentode with an indirectly heated cathode. The suppressor grid is connected directly to the cathode which is grounded through a resistance 213. A condenser 214 is shunted across this resistance. The screen grid is connected through a resistance 215 and a condenser 216 to ground and a second condenser 217 is connected directly from the screen grid to the ground.

The plate of the pentode amplifier 211 is supplied with voltage through a circuit including, in series, three resistors 218, 219 and 220, and a choke coil 221. Currents of unwanted frequencies are carried off to ground at three points, between the resistors 219 and 220 by a condenser 222, between the last resistor 220 and the choke 221 by a condenser 223 and between the choke and the battery 206 by a condenser 224. Voltage bias for the screen grid is taken from a point in the plate circuit between the resistors 218 and 219 and fed to the screen grid circuit at a point between the resistor 215 and the condenser 216. The plate circuit is thus further grounded through condenser 216 at a point between resistors 218 and 219 so that here again unwanted alternating currents are discharged.

Voltage for the operation of the next amplifier tube 227 is taken by a condenser 225 and a potentiometer 226 connected in series between the plate and ground. The movable contact of the potentiometer is connected directly to the control grid of this amplifier tube 227 which is another pentode tube with an indirectly heated cathode. As in the preceding tube the suppressor grid is connected directly to the cathode. The cathode is grounded through a resistance 228. The screen grid is connected to ground through a condenser 229 and also through a resistance 230 and condenser 231 in series. The plate is connected to the same source of voltage as is the plate of the preceding tube by being connected into the plate circuit of the preceding tube just above the choke coil 221 and the condenser 223. In series with the plate of tube 227 are two resistors 232 and 233 and a voltage is taken for the screen grid from a point between these two resistors and applied to the screen grid circuit between the resistor 230 and the condenser 231 of that circuit.

Voltage for the operation of the next amplifier tube 236, which is of the beam power type is taken by a circuit comprising a condenser 234 and a resistor 235 connected in series between the plate of the pentode 227 and ground. A condenser 235' is also connected across the resistor 235. The control grid of this tube 236 is connected to a point between the condenser 234 and the resistor 235. The beam power plates of the tube 236 are connected to the cathode and the cathode grounded through a resistor 237. The plate of the tube 236 is connected through the primary of a transformer 238 to the battery or other source of power 206 through the choke 221. The screen grid is connected directly to the same point without being connected through the primary of the transformer. The output winding of the transformer 238 is of the split type with leads from the center and both ends passing to the control unit 36. A meter 239 across the outer leads from the transformer indicates the voltage of the output circuit.

Referring now to Figure 12 for a detailed description of the circuit that receives and amplifies the phasing current it will be noted that the connection from the internal conductor of the cable and the ground connection from the outside of the cable are received at the left-hand edge of the drawing through a condenser 240 and the primary of the transformer 241. The condenser serves to stop the passage of direct current through the transformer winding. The core of the transformer 241 is grounded and the secondary is connected through a filter 242 which is a band pass filter passing only currents of a frequency in the neighborhood of that of the phasing current, which as has been said is preferably in the neighborhood of 592 cycles. The output of this filter is connected directly to the control grid of an amplifier tube 243 and a grid leak resistor 244 is connected between the grid and ground. The amplifier tube 243 is of the indirectly heated cathode type of pentode. The suppressor grid is connected directly to the cathode which in turn is connected to the ground through a resistor 245 and the plate receives voltage from a suitable source of power 246, which may be a battery as shown in the drawings. This power reaches the plate through a choke coil 247 and resistors 248 and 249 all connected in series. The screen grid receives its voltage from a point in the plate circuit between resistors 248 and 249 through a resistor 250. Alternating current is discharged to ground from the screen grid through a condenser 251. Alternating current is also discharged to ground from a point between resistors 248 and 249 by a condenser 252.

Voltage for the operation of the next amplifier tube 255 is taken from the plate of the tube 243 through a condenser 253 and a potentiometer 254 connected in series to ground. The sliding arm of the potentiometer 254 is connected directly to the grid of this amplifier tube 255 which is a triode having an indirectly heated cathode. The cathode is connected to ground through a resistor 256 and a condenser 257 is shunted across this resistor. From the plate of this tube plate current passes through the primary of a transformer 258 and through the choke 247 to the source of plate voltage. A condenser 259 by-passes alternating current around the choke 247 and the source of power to ground. Any alternating current that passes on through the choke is by-passed around the battery by a condenser 260 to ground.

The core of this second transformer 258 is also grounded and the secondary is of the split type with its center tap grounded through a resistor 261.

The end taps of the output of the transformer 258 are connected to the plates of a double diode 262, the cathodes of which are both grounded. The full wave rectified voltage taken from across the resistor 261 is passed through a band pass filter 263 and thereafter used for the control of the control grid of a second pentode 264. This band pass filter is arranged to pass only currents of around 74 cycles frequency, so that only the 74 cycle envelope of the phasing current passes to the next tube. A grid leak resistor 265 is connected between the control grid of this pentode and ground.

The suppressor grid of the pentode 264 is connected to the cathode which is in turn connected to ground through a resistor 266 across which is shunted a condenser 267. Plate voltages are supplied from the source of voltage 246 through a choke 268 and resistors 269 and 270 all connected in series. Alternating current is removed to the ground through a condenser 271 connected into the circuit between the choke 268 and the first resistor 269 and by a condenser 272 connected into the circuit between the two resistors 269 and 270. Voltage for the screen grid is taken from a point between the choke 268 and the resistor 269 through a resistor 273. Alternating current from the screen grid is discharged to ground through a condenser 274.

Voltage is supplied for the control of the next amplifier tube 277 which is of the beam power type by a circuit comprising a condenser 275 and a resistor 276 connected in series between the plate of the pentode amplifier tube 264 and ground. The control grid of the beam power amplifier, which is designated 277, is connected directly to this circuit at a point between the condenser and the resistance. Cathode and the beam plates are connected directly together in this tube and grounded through a resistor 278 shunted by a condenser 279. Current from the plate of this tube flows through the primary of a transformer 280 and through the choke coil 268 to the source of power 246. The screen grid of this tube is connected into the plate circuit below the transformer primary.

The core of the transformer 280 is grounded as are the cores of the other transformers and the output of the transformer is conducted to panel 36 for comparison with the output of panel 34. A meter 281 may be connected across the output of this amplifier for the purpose of checking the amplitude of the output.

Reference will now be had to Figure 13 for a detailed description of panel 36, which includes the circuit for comparing the outputs of panels 34 and 35 and adjusting the flow of direct current to null the system. This panel also furnishes the current which operates the recorder.

The currents from panels 34 and 35 enter panel 36 from the righthand end as shown in Figure 13. These currents comprise a 74 cycle signal current the amplitude of which is reduced to zero when the system is in balance and the 74 cycle phasing current which came to the surface as 592 cycle current modulated by the frequency of the vibrator or variable condenser in the well. This current, however, was rectified in the full wave rectifier 262 and the high frequency removed in the filter 263 so that it now is of the same frequency of the signal current. The signal current has been divided into two equal components by the center tap transformer 238 and is applied across leads 282, 283 and 284 at the right hand end of Figure 13. The phasing current from panel 35 is applied at the righthand end of Figure 13 across the leads 285 and 286.

Two double rectifier tubes 287 and 288 are connected in the bridge circuit so that current can flow only in an anti-clockwise direction as shown in Figure 13. Leads 282 and 284 are connected to opposite corners of this bridge so as to apply the full signal current across it. One of the other corners of the bridge is grounded and the remaining corner is connected through a pair of equal resistances 289 and 290 to ground. With the circuit as so far described current from the signal circuit may flow either through one of the rectifier tubes or through the other depending upon its direction but it can never flow through both rectifier tubes at the same time since the tubes are arranged for flow in opposite directions. Therefore current will never flow from the ground across the bridge and through the resistors 289 and 290 and voltage will never be developed across these resistors.

In addition to the circuit so far described, however, the center tap connection 283 from the signal circuit is connected to the connection 285 which goes to the phasing current circuit and the connection 286 from the phasing current circuit is connected to a point between the resistors 289 and 290. Now, if phasing current were applied and no signal current were applied the potential would be applied on one side through the lead 285, through the windings of the transformer of the signal circuit and the leads 282 and 284 to the upper and lower corners of the bridge, which would thus be brought to substantially the same potential. A different potential would be applied through the lead 286 and the resistor 290 to ground and resistor 289 to the righthand corner of the bridge so that the righthand corner and the lefthand corner of the bridge would be at the same potential, which potential would be different from that at the upper and lower corners of the bridge. Under these circumstances current would flow in two opposite legs of the bridge but the circuit would be balanced and hence no voltage would be developed across the combination of resistors 289 and 290 because the currents through them would be equal and in opposite directions.

Suppose, however, for purpose of illustration, that both signal current and phasing current are simultaneously applied, and suppose for the purpose of illustration it is considered that the lead 282 becomes positive as compared to the lead 284 and the lead 285 becomes positive as compared to the lead 286. When the lead 285 becomes positive current tends to flow through the lead 283 and the secondary of the transformer of the signal circuit through leads 282 and 284 and through the upper half of the rectifier 288 and the lower half of the rectifier 287. That which tends to flow through the lower half of rectifier 287 tends to pass to ground and upward through the resistor 290 back into the line 286. That which tends to pass through the upper half of rectifier 288 tends to pass through the resistor 289 and back to the lead 286 thus balancing the current flow in the resistors. If we now add the current flowing in the signal circuit we find that it tends to pass through the upper half of the rectifier 288 in the same direction as the phasing current, but it also tends to pass through the lower part of rectifier 287, to get to the lead 284. If it did this, however, there would then be current passing both directions through lead 284, which cannot be, so the two currents tend to offset each other and flow is consequently reduced in the lower halves of the rectifiers until one or the other has no flow through it. This means a consequent reduction in current flow through the lower half of rectifier 287 to ground and a reduction in the current in the lower resistor 290. At the same time, since the current through the upper half of the rectifier 288 must go somewhere it passes through the resistor 289 and back through the phasing circuit transformer, thus increasing the current flow in resistor 289.

We now have a situation where the current flow through resistor 289 is increased and the current flow through resistor 290 is decreased. Thus the voltage drop across resistor 289 becomes greater and a positive overall voltage is developed across the pair of resistors. It is therefore evident that the existence of the two voltages, in phase, creates a voltage across the two resistors 289 and 290 whereas the absence of either voltage or their being out of phase prevents the developing of voltage.

The voltage across these resistors is taken through a low pass filter 291 and applied through a resistor 292 to the control grid of a pentode 293. A grid leak resistor 294 is placed across the output of the filter. A condenser 295 is connected between the control grid of the tube 293 and ground to still further eliminate alternating current.

The cathode of the amplifier 293 is connected through a resistor 296 to ground and the screen and suppressor grids are connected to the plate which is in turn connected through a meter 297 to a source of voltage 298 which in turn is connected through a resistor 299 to a potentiometer 300 shunted across a second source of potential 301 and the negative side of which is grounded. Thus the plate of this amplifier has applied to it a voltage which can be controlled by the setting of the potentiometer 300.

Direct current is taken from the plate circuit of the amplifier 293 and sent back to the well through the supporting cable from across the resistor 299, the potentiometer 300 and the battery 301, by connections extending to the left-hand edge of Figure 13. One of these connections is grounded and the other includes a resistor 302, a resistor 303 and a meter 304. As the plate current of the tube 293 increases the potential drop across the resistor 299 increases and thus the voltage and current sent to the instrument in the well is increased. Assuming that the correct phase relation had been established between the phasing current and the signal current this will tend to balance the system in the well and thus reduce the signal current which in turn reduces the plate current in the tube 293 until a state of balance is reached.

This balancing operation is assisted and the recorder operated by another pentode amplifier tube 305, the plate of which is connected to the positive side of the power source 298 and the cathode of which is connected to the negative side of the same power source through the resistor 302, a variable resistor 306, a fixed resistor 307 and a meter 308. The recorder is operated in accordance with the current in this circuit by being connected directly across the variable resistance 306. By varying this resistance the recorder response may be readily adjusted.

The control grid of the amplifier 305 is connected alternatively through one of three resistors 309, 310 and 311, each having a different resistance, by a switch 312 to a point in the plate circuit of the first amplifier 293 between the power source 298 and the resistor 299. Thus as the plate current in the first amplifier tube 293 is raised the voltage of the control grid of the tube 305 is also raised at a rate depending upon the value of the resistors 309, 310 or 311 that is connected in circuit with it. The plate current of the tube 305 therefore increases and aids the plate current of the first amplifier 293 to bring the measuring circuit into balance. At the same time this plate current governs the action of the recorder. Alternating current that gets into the grid circuit of the second amplifier 305 is grounded through condensers 313 and 314, the first of which is connected between the grid of the amplifier and a point between resistors 302 and 303 in the well circuit and the second of which, condenser 314, is connected from this point to ground.

For the purpose of adjusting the circuit in the beginning a grounding switch 315 is provided between the control grid of the amplifier tube 293 and the ground. With this switch closed the circuit may be manually adjusted by reference to the various meters so that normal amounts of current will flow in the various circuits. When the grounding switch 315 is opened the automatic control circuit begins to function.

No attempt has been made to give characteristics of resistances, condensers, chokes, transformers, power sources, amplifying tubes, rectifying tubes or the like, since it will be obvious to one skilled in the art that these may be varied widely in accordance with the wishes of the designer of any particular instrument. Likewise, constructional details of the various amplifying and controlling circuits have been omitted since they also are subject to wide variation. Many of the details that have been shown can also be changed without departing from the spirit of this invention but most of these details have been found useful in the practical instrument and therefore are believed worthy of illustration. It is to be understood, however, that this invention is not limited to any specific details except as specified in the appended claims.

We claim:

1. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit the balance of which is adapted to be adjusted by the surface equipment, and means for sending signals of a plurality of frequencies to the surface for indicating whether or not the null system is in balance and if not, the direction of unbalance.

2. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit the balance of which is adapted to be adjusted by the surface equipment, and means for sending to the surface over a single pair of conductors, signals of a plurality of frequencies indicating whether or not the null system is in balance and if not, the direction of unbalance.

3. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit the balance of which is adapted to be adjusted by the surface equipment, a means for sending to the surface over a single pair of conductors signals indicating whether or not the null system is in balance and if not, the direction of unbalance, and means in the surface equipment for sending back to the instrument a balance controlling current for the null system over the same pair of conductors.

4. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, means for determining the state of balance of the null system circuit, means for converting this determination into alternating current of a constant frequency and transmitting the alternating current to the surface, means for generating a second alternating current of a higher frequency modulated by the frequency of the first mentioned alternating current, means for transmitting the modulated higher frequency current to the surface, and means in the surface equipment for comparing the phase of the lower frequency component of the high frequency current with the lower frequency current to determine the state of balance of the null system.

5. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, means for determining the state of balance of the null system circuit, means for converting this determination into alternating current of a constant frequency and transmitting the alternating current to the surface, means for generating a second alternating current of a higher frequency modulated by the frequency of the first mentioned alternating current, means for transmitting the modulated higher frequency current to the surface, means in the surface equipment for comparing the phase of the lower frequency component of the high frequency current with the lower frequency current to determine the state of balance of the null system, and means in the surface equipment for automatically bringing the null system to balance.

6. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, means for determining the state of balance of the null system circuit, means for converting this determination into alternating current of a constant frequency and transmitting the alternating current to the surface, means for generating a second alternating current of a higher frequency modulated by the frequency of the first mentioned alternating current, means for transmitting the modulated higher frequency current to the surface, means in the surface equipment for comparing the phase of the lower frequency component of the high frequency current with the lower frequency current to determine the state of balance of the null system, and for operating a recorder in accordance with the adjustment necessary to bring the null system to balance.

7. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, and means for sending signals of a plurality of frequencies to the surface for indicating whether or not the null system is in balance and if not, the direction of unbalance, said instrument in the well comprising an elongated tubular steel casing, one longitudinal section of which is completely occupied by the ionization chamber and another longitudinal section of which encloses the null system circuit.

8. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, means for sending signals of a plurality of frequencies to the surface for indicating whether or not the null system is in balance and if not, the direction of unbalance, said instrument in the well comprising an elongated tubular steel casing, one longitudinal section of which is completely occupied by the ionization chamber and another longitudinal section of which encloses the null system circuit, and means for supplying power to the null system.

9. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, and means for sending to the surface over a single pair of conductors signals indicating whether or not the null system is in balance and if not, the direction of unbalance, said instrument in the well comprising a plurality of elongated tubular sections of steel casing sealed together, one of said sections being occupied solely by the ionization chamber, another of said sections containing the null system circuit.

10. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, means for sending to the surface over a single pair of conductors signals indicating whether or not the null system is in balance and if not, the direction of unbalance, said instrument in the well comprising a plurality of elongated tubular sections of steel casing sealed together, one of said sections being occupied solely by the ionization chamber, another of said sections containing the null system circuit, and a source of power therefor.

11. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit, the balance of which is adapted to be adjusted by the surface equipment, and means for sending to the surface over a single pair of conductors signals indicating whether or not the null system is in balance and if not, the direction of unbalance, said instrument in the well comprising a plurality of elongated tubular sections of steel casing detachably sealed together, one of said sections being occupied solely by the ionization chamber, another of said sections containing the null system circuit.

12. Apparatus as defined by claim 1 in which the surface apparatus includes means for selectively amplifying a signal from the well indicating the state of balance of the null system, means for selectively amplifying a signal from the well indicating, when compared with said first current, the direction of any unbalance in the null system and means for combining said two amplified signals to determine the fact of and direction of unbalance if any, and for returning to the well an electrical current which will restore the balance of the null system.

13. In an apparatus for well surveying a circuit for comparing two alternating currents and making an adjustment dependent upon the simultaneous existence of the two currents and their phase relation which comprises a bridge circuit having a rectifier in each arm, all of said rectifiers being arranged to pass current in the same direction around the bridge, means to impress one of the currents diagonally across the bridge, a voltage dividing means across the source of that current, means to apply the other current between the center of the voltage dividing means and through a pair of equal resistors to the remaining opposite corners of the bridge and means to operate a control circuit from the voltage developed across said two equal resistors.

14. A thermionic tube control device which comprises two thermionic tubes, the grid of the first of which is controlled by an incoming signal derived from a null system circuit and the plate of the first of which is connected through a battery, a resistance and a second battery, all in series, to its cathode, and the plate of the second of which is connected through the first mentioned battery and another resistance to its cathode, and the grid of which is connected into the plate circuit of both tubes at a point between the first mentioned battery and the resistances, and another circuit supplied by current taken from across the first mentioned resistance and the second mentioned battery for reestablishing the state of balance in the null system.

15. In a measuring instrument for making measurements in a well bore the improvement which consists in a source of electrical power in the instrument and at least one gravity-operated switch for disconnecting this source of power when the instrument is placed on its side.

16. Apparatus for well surveying that comprises an instrument adapted to be lowered into a well, a cable for supporting said instrument in the well and connecting it electrically to surface equipment, surface equipment responsive to measurements made by said instrument and a recorder operated by said surface equipment, the instrument in the well including an ionization chamber responsive to radioactive radiations, connected into a null system circuit the balance of which is adapted to be adjusted by the surface equipment, and means for sending signals of a plurality of frequencies to the surface for indicating whether or not the null system is in balance and if not, the direction of unbalance, the surface equipment including means for selectively amplifying the signals of one frequency, means for selectively amplifying the signals of another frequency and converting those signals into signals of the same frequency as the first mentioned signals, and means for comparing the amplitude and phase relation of the two sets of signals and adjusting the null system in accordance with the comparison.

17. An apparatus as defined in claim 16 in which one of the amplifiers includes means to adjust the phase of the current being amplified.

18. Apparatus as defined in claim 16, in which one of the amplifiers includes means to reverse the phase of, and means to adjust the phase of the signal being amplified.

19. Apparatus as defined in claim 1 in which means are additionally provided to supply operating power for the instrument in the well from the surface of the earth through the supporting cable and in which means are provided in the instrument in the well for removing this supply of power from the supporting cable and converting it into the proper kinds and amounts of power to operate the measuring instrument.

20. Apparatus as defined in claim 1 in which means are additionally provided to supply operating power for the instrument in the well from the surface of the earth through the supporting cable and in which means are provided in the instrument in the well to remove this power from the supporting cable, rectify it and supply it in proper amounts to the measuring circuit.

21. In an apparatus for well surveying means for generating a high frequency signal modulated in amplitude at a low frequency rate comprising a rectifier for rectifying a portion of the energy of the low frequency source in such a way that current flows through the rectifier only during a small portion of each cycle, a parallel resonant inductance and capacitance circuit tuned to the desired high frequency through which the rectifier current is made to flow and means for deriving an output signal from the voltage developed across the resonant circuit.

SERGE ALEXANDER SCHERBATSKOY.
GILBERT SWIFT.
ROBERT EARL FEARON.
JACOB NEUFELD.